(12) United States Patent
Paul et al.

(10) Patent No.: US 9,212,300 B2
(45) Date of Patent: Dec. 15, 2015

(54) REACTIVE HOT MELT ADHESIVE

(75) Inventors: Charles W. Paul, Madison, NJ (US); Wu Suen, Flemington, NJ (US); David J. Good, Ann Arbor, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 1413 days.

(21) Appl. No.: 11/837,152

(22) Filed: Aug. 10, 2007

(65) Prior Publication Data

US 2009/0042040 A1 Feb. 12, 2009

(51) Int. Cl.
| | | |
|---|---|---|
| *C08F 8/00* | (2006.01) | |
| *C08L 83/00* | (2006.01) | |
| *C08L 101/10* | (2006.01) | |
| *C09J 171/02* | (2006.01) | |
| *C08F 283/00* | (2006.01) | |
| *C08F 283/06* | (2006.01) | |
| *C08F 283/10* | (2006.01) | |
| *C08G 65/336* | (2006.01) | |
| *C09J 133/02* | (2006.01) | |
| *C09J 151/00* | (2006.01) | |
| *C09J 151/08* | (2006.01) | |
| *C08L 51/08* | (2006.01) | |
| *C08L 71/02* | (2006.01) | |

(52) U.S. Cl.
CPC ............ *C09J 171/02* (2013.01); *C08F 283/00* (2013.01); *C08F 283/06* (2013.01); *C08F 283/10* (2013.01); *C08G 65/336* (2013.01); *C09J 133/02* (2013.01); *C09J 151/003* (2013.01); *C09J 151/085* (2013.01); *C08L 51/08* (2013.01); *C08L 71/02* (2013.01); *C08L 2312/08* (2013.01); *Y10T 428/31612* (2015.04); *Y10T 428/31663* (2015.04)

(58) Field of Classification Search
CPC .... C08F 283/00; C08F 283/06; C08F 283/10; C08F 65/336; C09J 133/02; C09J 151/003; C09J 151/085; C09J 171/02
USPC ................. 524/266, 272, 504, 529, 533, 535
See application file for complete search history.

(56) References Cited

U.S. PATENT DOCUMENTS

| | | | |
|---|---|---|---|
| 4,593,068 A | 6/1986 | Hirose et al. | |
| 4,783,504 A | 11/1988 | St. Clair et al. | |
| 5,097,053 A | 3/1992 | Baghdachi et al. | |
| 5,331,049 A | 7/1994 | Audett et al. | |
| 5,346,939 A * | 9/1994 | Moren et al. ................. 524/176 |
| 5,604,033 A | 2/1997 | Arthurs et al. | |
| 5,669,940 A | 9/1997 | Stubbs | |
| 6,121,354 A | 9/2000 | Chronister | |
| 6,204,350 B1 * | 3/2001 | Liu et al. ........................ 528/23 |
| 6,303,731 B1 * | 10/2001 | Carlson et al. .................. 528/59 |
| 6,350,345 B1 | 2/2002 | Kotani et al. | |
| 6,433,055 B1 | 8/2002 | Kleye et al. | |
| 6,437,071 B1 | 8/2002 | Odaka et al. | |
| 6,437,072 B1 | 8/2002 | Jyono et al. | |
| 6,444,775 B1 | 9/2002 | Jyono et al. | |
| 6,613,816 B2 | 9/2003 | Mahdi et al. | |
| 6,642,309 B2 | 11/2003 | Komitsu et al. | |
| 6,649,016 B2 | 11/2003 | Wu et al. | |
| 6,664,323 B2 | 12/2003 | Lucas | |
| 6,749,943 B1 | 6/2004 | Tangen et al. | |
| 6,777,485 B1 | 8/2004 | Ito et al. | |
| 6,803,412 B2 | 10/2004 | Nguyen-Misra et al. | |
| 6,828,403 B2 | 12/2004 | Mahdi et al. | |
| 6,967,226 B2 * | 11/2005 | Shah ............................. 524/590 |
| 7,067,563 B2 | 6/2006 | Klein et al. | |
| 7,087,127 B2 | 8/2006 | Mahdi et al. | |
| 7,091,298 B2 | 8/2006 | Schindler et al. | |
| 7,153,911 B2 | 12/2006 | Yano et al. | |
| 2004/0181007 A1 * | 9/2004 | Acevedo et al. ............. 524/589 |
| 2005/0043455 A1 | 2/2005 | Hohner | |
| 2005/0215702 A1 * | 9/2005 | Slark et al. .................... 524/589 |
| 2006/0142532 A1 | 6/2006 | Wintermantel et al. | |
| 2008/0125539 A1 | 5/2008 | Mack | |
| 2008/0312401 A1 | 12/2008 | Sato | |

FOREIGN PATENT DOCUMENTS

| | | |
|---|---|---|
| DE | 19516457 | 11/1995 |
| DE | 10 2004 055450 | 5/2006 |
| EP | 0310704 | 6/1994 |
| EP | 1788035 | 5/2007 |
| GB | 2197326 | 5/1988 |
| GB | 2292154 | 2/1996 |
| JP | 60235747 | 11/1985 |
| JP | 1163281 | 12/1987 |
| JP | 1301740 | 12/1989 |
| JP | 2150488 | 6/1990 |
| JP | H04335080 A | 11/1992 |
| JP | 10251357 | 9/1998 |
| JP | 3030020 | 6/2000 |
| JP | 3621678 | 9/2003 |
| JP | 4176028 | 6/2004 |
| JP | 2006291021 A | 10/2006 |
| JP | 2006523253 A | 10/2006 |
| JP | 2009024107 A | 2/2009 |
| WO | WO89/11506 | 11/1989 |
| WO | WO89/11514 | 11/1989 |
| WO | 9001607 | 2/1990 |
| WO | WO91/06580 | 5/1991 |
| WO | WO91/08240 | 6/1991 |
| WO | WO2006/028927 | 3/2006 |

OTHER PUBLICATIONS

International Search Report for PCT/US2008/072590.

* cited by examiner

*Primary Examiner* — David W Wu
*Assistant Examiner* — Marie Reddick
(74) *Attorney, Agent, or Firm* — Steven C. Bauman

(57) ABSTRACT

High green strength reactive hot melt adhesives are prepared using silane-functional liquid polymers. The adhesive are formulated using a silane-reactive polymer or, alternatively, a non-silane-reactive polymer together with a compatible tackifier.

19 Claims, 1 Drawing Sheet

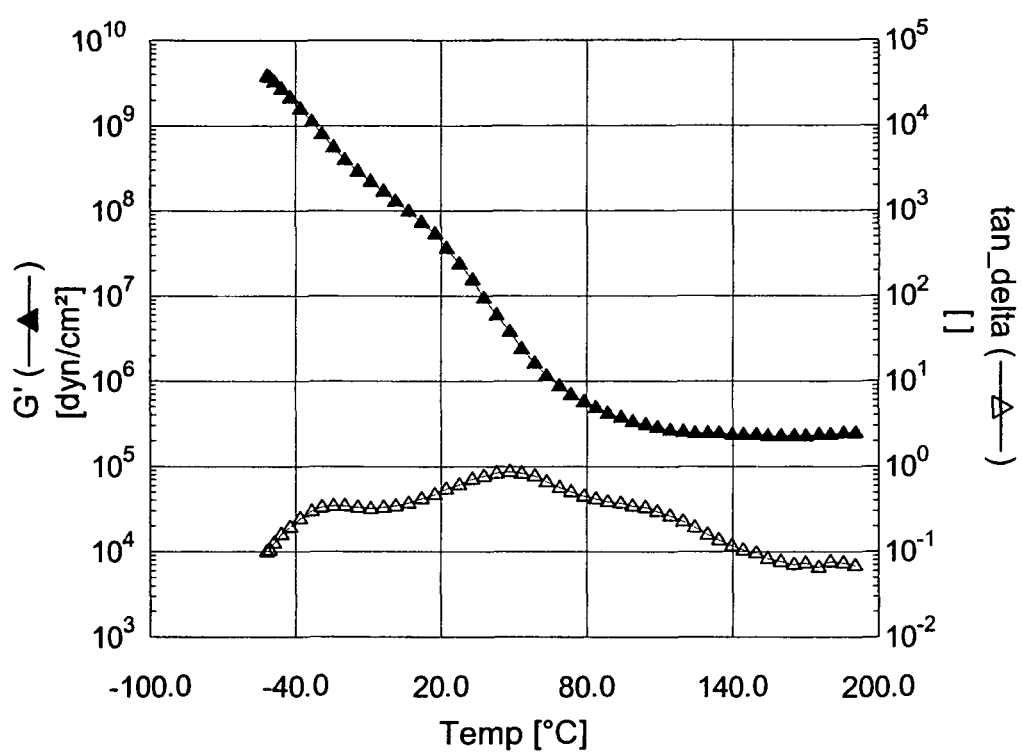

REACTIVE HOT MELT ADHESIVE

FIELD OF THE INVENTION

The invention relates to hot melt adhesives, in particular reactive hot melt adhesives having improved properties.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. Advantages of hot melt curable adhesives over traditional liquid curing adhesives are (1) their ability to provide "green strength" upon cooling prior to cure and (2) they provide adhesives of very low crosslinking density and thus high levels of flexibility and toughness.

The majority of reactive hot melts are moisture-curing urethane adhesives. These adhesives consist primarily of isocyanate terminated polyurethane prepolymers that react with surface or ambient moisture in order to chain-extend, forming a new polyurethane/urea polymer. Polyurethane prepolymers are conventionally obtained by reacting diols with diisocyanates. Cure is obtained through the diffusion of moisture from the atmosphere or the substrates into the adhesive and subsequent reaction. The reaction of moisture with residual isocyanate forms carbamic acid which is unstable, decomposing into an amine and carbon dioxide. The amine reacts rapidly with isocyanate to form a urea. The final adhesive product is a lightly crosslinked material held together primarily through hydrogen bonding, urea groups and urethane groups.

Silane-based moisture curing adhesives have several advantages over isocyanate-based adhesives. These advantages include: 1) no bubbling in the bond line since the by-product of the curing reaction is not a gas (instead of $CO_2$, ordinarily methanol or ethanol is released), 2) increased flexibility after crosslinking since siloxane bonds are more flexible than urea bonds which strongly hydrogen bond to each other, 3) no hazardous isocyanate vapors, and 4) improved adhesion to glass and other surfaces through reaction with surface hydroxyls. Hot melt adhesives incorporating silane crosslinking groups have been developed based on a number of solid polymers. Grafting of silane reactive groups onto polyolefins (H. G. Wey, Munich Adhesives and Processing Seminar 1997), unsaturated styrenic block copolymers (WO 91/06580), polyurethanes (U.S. Pat. No. 6,749,943), and ethylene vinyl acetate copolymers (GB 2,197,326) have had limited commercial success, likely due to the inability of the silane groups to condense with sufficient rapidity when attached to a solid polymer. In addition, transesterification of silanol groups with ester groups has limited the choice of catalysts (U.S. Pat. No. 6,749,943).

A need exists for improved hot melt adhesives based on silane cure. The present invention addresses this need.

SUMMARY OF THE INVENTION

The invention provides moisture curable reactive hot melt adhesive compositions that provide isocyanate-free moisture cure and have improved safety and handling properties.

One aspect of the invention is directed to a hot melt adhesive composition comprising one or more liquid silane-functional polymers and one or more polymers containing a silane-reactive group. The composition may optionally contain other ingredients such as tackifiers, waxes, conventional low molecular weight silane coupling agents, drying agents, catalysts, pigments and/or inorganic fillers.

Another aspect of the invention is directed to hot melt adhesive compositions comprising liquid silane-functional polymers and one or more polymers which are non-silane reactive and, additionally, a tackifier resin.

Yet another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising a moisture cured adhesive of the invention. These articles comprising at least a first and a second substrate, wherein the first substrate is bonded to the second substrate with an adhesive of the invention that has been moisture cured. The substrates may be the same or different. In one embodiment, at least one of the first or second substrate is glass.

BRIEF DESCRIPTION OF THE DRAWING FIGURE

FIG. 1 shows a dynamic mechanical analysis of the adhesive of Sample 2a.

DETAILED DESCRIPTION OF THE INVENTION

The disclosures of all documents cited herein are incorporated in their entireties by reference.

All percents are percent by weight of the adhesive composition, unless otherwise stated.

It has now been discovered that a safe and easily handled reactive hot melt adhesive may be prepared using a liquid silane-functional polymer combined with a silane-reactive polymer. The grafting of these two polymers improves their compatibility in the melt phase while increasing the green and cured strength of the final adhesive.

It has also been found that silane-functional liquid polymers can be combined with polymers that are non-reactive using tackifier resin(s) to compatibilize the blend.

The reactive hot melt compositions of the invention are useful for bonding articles composed of a wide variety of substrates (materials), including but not limited to wood, metal glass and textiles. As such, these adhesives find particular use in applications such as bonding to exterior surfaces, laminating, plastic bonding, profile wrapping, and bonding to wood. Other non-limiting uses include textile bonding applications (carpet and clothing), use in the manufacture of footwear (shoes), use as a glazing/backbedding compound in the manufacture of windows, use in the manufacture of doors including entry doors, garage doors and the like, use in the manufacture of architectural panels, use in bonding components on the exterior of vehicles, and the like.

The adhesives of the invention are flexible and react with surface substrates strongly, making them particularly useful as glazing/backbedding compounds when safety issues are of critical concern such as for improved fenestration construction in, e.g., hurricane prone regions. The term glazing compound is used herein to refer to what is conventionally referred to in the art as a backbedding compound, and functions to hold a glass window pane securely in the window frame or sash. A fenestration is an opening in a building, i.e., a wall or roof, automobile or the like for receiving and retaining a glass pane positioned for retention within said central opening. A fenestration construction or product is a door, window, or skylight assembly that fits in a building opening and is used to close the opening. Included are automobile windshields and the like.

The composition of the invention is prepared using one or more liquid silane-functional polymers (polymer A) and either a silane-reactive polymer (polymer B1) or a non-silane reactive polymer (polymer B2).

The silane functional polymer comprises a silane or silyl group is represented by:

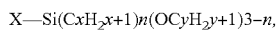

X—Si(C$x$H$_{2x+1}$)$_n$(OC$y$H$_{2y+1}$)$_{3-n}$, wherein n=0, 1 or 2;

x and y are, independently, integral numbers from 1 to 12 and X is a group, such as ethylene, that links the silane to the polymer backbone.

The silane groups are hydrolyzed by water to silanol groups which can condense with each other or with reactive species on the adherent surfaces. The number of silane groups will preferably be more than at least one per molecule (to generate a fully cured network), and more preferably at least two per molecule. Most preferably, the silane functional polymer is telechelic, where most or all the ends are silane functional. The number of silyl ether groups per silane end group, 3–n, is preferably 2 or 3 (n=1 or 0).

The backbone of the silane functional polymer can be of various structures, such as polyolefin, polyacrylate, polypropylene oxide or polyurethane (such as Baycoll 2458 from Bayer), but is preferably a polyether or most preferably an acrylate modified polyether (prepared for instance as described in US published application 2002/0084030 A1) such as MAX 951 available from Kaneka Corporation. The polymer is liquid at room temperature providing more rapid reaction of the silane end groups in the solidified adhesive after application to the substrate, and to aid mobility of the reactive sites and thus increase the potential for covalent reaction with the surface of one or both substrates.

The amount of silane-functional polymer in the formulation will depend on its molecular weight and functionality, but will typically be from 20-80 wt %, preferably 30-60 wt %, and most preferably 35-55 wt %.

The second polymer (B) provides green strength (uncured strength) to the cooled hot melt adhesive. B can be either a silane-reactive polymer (B1) or non-reactive (B2). Silane reactive groups include carboxylic acid, amine, thiol and hydroxyl. Preferred is carboxylic acid. The number of groups should be sufficient such that a significant amount, at least 5%, of the polymer is grafted via the silane groups. Grafting provides compatibility in the melt phase, before the adhesive is applied and before any reaction with moisture. After bonding and cooling, a phase separated morphology is often preferred as this maximizes the toughness of the adhesive. A phase separated morphology is evidenced by the existence of two glass transition temperatures ($T_g$s) and sometimes also by an increase in opacity upon cooling. The grafted polymer, when using B1, ensures a fine phase separation upon cooling and a tough adhesive. Ideally the silane reactive polymer separates into a solid phase after application and cooling, but is linked to the curing silane polymer phase through the grafted polymer. The amount of solid polymer, B, in the formulation will depend on a number factors, including the glass transition temperature and molecular weight of the polymer, but will normally be from 5-70%, preferably 10-50%, and most preferably 20-40%.

Preferred is a reactive solid acrylic copolymer containing acid and hydroxyl groups of which Elvacite 2903 from INEOS Acrylics is an example. This material has an acid number 5.2 and hydroxyl number of 9.5.

Optionally the adhesive with B1 will also contain 0-70% of a tackifier, preferably 5-50%, and most preferably 20-40%. The choice of tackifier will depend on the backbone of the silane-functional and silane-reactive polymers. The tackifier choices include natural and petroleum-derived materials and combinations thereof as described in: C. W. Paul, "Hot Melt Adhesives", in *Adhesion Science and Engineering-2, Surfaces, Chemistry and Applications*, M. Chaudhury and A. V. Pocius eds., Elsevier, New York, 2002, p. 718. Tackifiers serve to reduce the melt viscosity of the adhesive and also can act to compatibilize the A and B polymers in the melt, acting effectively as a solid solvent. Preferred materials include rosin esters, aromatic $C_9$ hydrocarbon resins, aliphatic-modified aromatic $C_9$ hydrocarbon resins, phenolic-modified terpene resins, phenolic-modified aromatic resins, and pure monomer resins. These tackifiers have solubility parameters of >8.4 $(cal/cm^3)^{0.5}$ and preferably >8.6 $(cal/cm^3)^{0.5}$. Most preferred are hydrogenated rosin esters such as KE-100, available from Arakawa Chemical Co. and alpha-methyl styrene resins such as Kristalex 3100 available from Eastman Chemical Co.

Adhesive compositions comprising non-reactive polymer, B2, require 10-50% tackifier to obtain adequate melt compatibility and green strength. Preferred is 20-40% tackifier.

The adhesive further comprises a catalyst to promote the cure of the silane groups. The type of catalyst can include conventional catalysts such as tin alkanoates, for example dibutyl tin dilaurate, and titanium alkoxides such as Tyzor GBA, available from Dupont. A more extensive list of catalysts (also called accelerators) suitable for curing the silane groups is described in US 2002/0084030. The level of catalyst is 0.05 to 5% by weight, preferably 0.2 to 3% and most preferably 0.5-2%.

The adhesive optionally comprises a moisture scavenger to extend its pot life, such as vinyl trimethoxy silane. Levels employed can be from 0 to 3% and preferably from 0.5 to 2%.

The adhesive optionally comprises an adhesion promoter or coupling agent which promotes bonding to the adherend. Examples are described in: Michel J. Owen, "Coupling agents: chemical bonding at interfaces", in *Adhesion Science and Engineering-2, Surfaces, Chemistry and Applications*, M. Chaudhury and A. V. Pocius eds., Elsevier, New York, 2002, p. 403. Preferred are organo-silanes which can link the silane-functional polymer to the surface such as amino and epoxy silanes. Most preferred is glycidoxy propyl trimethoxy silane. Levels are 0.01 to 10%, preferably 0.1 to 5% and most preferably 0.2-3%. The adhesion promoter, if more reactive than the silane-functional polymer with moisture, can also serve as a moisture scavenger.

The grafting reaction of the silane-functional polymer and silane reactive polymer takes place in the melt state, prior to application of the adhesive. Reaction and mixing take place simultaneously at a temperature above 100° C., but preferably below 160° C.

Hot melt adhesives require a sufficiently low viscosity for easy application and good wet-out of the substrates. Preferred is a viscosity below 100,000 cP at the application temperature, more preferred is less than 25,000 cP, and most preferred is less than 15,000 cP. Application temperatures are determined by the thermal stability of the formula and the heat sensitivity of the substrates. Preferred are temperatures below 170° C., more preferred is below 150° C., and most preferred is less than 140° C.

After application, to adhere articles together, the reactive hot melt adhesive composition is subjected to conditions that will allow it to solidify and cure to a composition that has an irreversible solid form. Solidification (setting to the green or uncured state) occurs when the liquid melt is subjected to room temperature. Curing, i.e. chain extending, to a composition that has an irreversible solid form, takes place in the presence of ambient moisture.

As used herein, "irreversible solid form" means a solid form wherein the silane-functional polymer in the adhesive has reacted with moisture and itself to produce an insoluble siloxane linked material.

The invention is further illustrated by the following non-limiting examples.

EXAMPLES

Example 1

This example evidences the effect of the grafting of a silane-functional liquid polymer with a silane-reactive acrylic polymer.

Blends of 62.5 parts of a silane functional liquid polymer (MAX 951, commercially available from Kaneka) and 37.5 parts of solid acrylic co-polymers containing methyl methacrylate and n-butyl methacrylate and having varying levels of silane-reactive acid group were made by two different methods.

Method 1 (solvent blended): The two polymers were mixed in solvent (toluene) at room temperature until fully dissolved, and then the solvent was allowed to evaporate.

Method 2 (melt blended): The two polymers were mixed at 300° F. for one hour.

The samples were then judged for compatibility and the highest temperature at which they appeared opaque was recorded as the cloud point. The results are shown in Table 1.

Gel permeation chromatography (GPC) on the solid acrylic polymers and the blends was conducted in THF solvent. As shown in Table 1, the acid containing acrylic polymers had a slightly higher z-average molecular weight, but the blends only had an increase in Mz if there was acid present. The Mz was almost doubled at the highest acid level (acid # of 13.5, corresponding to about 2 wt % methacrylic acid). In addition, the viscosity of the blends increased dramatically with acid content. The data indicated that upon heating the acid groups on the acrylic reacted with the silane-functional polymer to form higher molecular weight grafted species that are compatibilizing the blend.

Example 2

This example compares formulations of the invention with a commercially available window glazing formulation.

Sample 2a

To a metal paint can were added 1.4 parts of Resiflow LF (an acrylic anti-foaming agent available from Estron Chemical), 105 parts of Elvacite 2903 (a solid acrylic polymer with an acid # of 5.2 and a hydroxyl number of 9.5, available from Ineos Acrylics), 52.5 parts of KE-100 (a hydrogenated rosin ester available from Arakawa Chemical Co.), and 52.5 parts of Kristalex 3100 (an alpha-methyl styrene tackifier available from Eastman Chemical Co.). These components were heated to 305° F. and stirred until homogeneous. Vacuum was applied to remove any water and the set temperature was lowered to 240° F. When the temperature had reached the set point, about ½ hr, 140 parts of MAX 951 was added and vacuum was applied for ½ hr more. At this point 0.7 parts of gamma-aminopropyl triethoxy silane (Silquest A1110 from Momentive Performance Materials), 3.5 parts of dibutyl tin dilaurate, and 2.6 parts of glycidoxy propyl trimethoxy silane were added and mixing was continued for 15 additional minutes. The final adhesive was poured into another container and sealed under nitrogen.

TABLE 1

| | | | | Method 2 | | |
| --- | --- | --- | --- | --- | --- | --- |
| Sample | Acid # | Acrylic Mz (kDa) | Method 1 | Cloud point (° F.) | Viscosity @ 250° F. (cP) | Blend Mz (kDa) |
| 1 | 0 | 126 | incompatible - phase separation | Incompatible | | 128 |
| 2 | 2.4 | | incompatible - phase separation | 220 | 2725 | |
| 3 | 5.3 | | incompatible - phase separation | 188 | | |
| 4 | 7.5 | 134 | incompatible - phase separation | 145 | 6250 | 196 |
| 5 | 13.5 | 137 | incompatible - phase separation | 25 | 9500 | 253 |

As shown in Table 1, all samples prepared by solvent blending at room temperature (Method 1) were found to be incompatible. When the solvent was evaporated two distinctly different phases were apparent. One phase corresponded to the liquid silane-functional polymer phase and the other phase to the solid acrylic co-polymer. In contrast, the samples prepared by hot melt blending at 300° F. (Method 2) produced compatible blends for acrylic copolymers that contained acrylic acid monomer. Acrylic co-polymers with more acrylic acid content had lower cloud point which demonstrates increased compatibility.

Sample 2b

An adhesive with the same formulation as Sample 2a was prepared except that the level of epoxy silane was doubled to 5.2 parts of glycidoxy propyl trimethoxy silane.

Both Sample 2a and Sample 2b were clear in the melt state, indicating excellent compatibility, but cooled to cloudy adhesive films. Dynamic mechanical analysis using a Rheometrics RDA-III was conducted on cured films of each and both exhibited two glass transition temperatures. One $T_g$ was at about −24° C. and the other was at about 50° C. as shown in FIG. 1. The second, high $T_g$ phase provides green strength to the uncured adhesive. The flat plateau modulus, G', at high temperatures (>110° C.) is evidence of the crosslinked nature of the final adhesive.

The following procedures were conducted to assess adhesive properties

Viscosity:

Viscosities were determined using a Brookfield viscometer with a Thermosel heating unit and spindle 27.

Peel Adhesion from Glass Substrate:

The adhesive was heated at 250° F. in an oven for 1 hour and then extruded from a heated gun onto a clean glass substrate framed by a silicone mold of 1.5 inch×5.5 inch and 0.125 inch in thickness. A strip of stainless steel wire mesh was then imbedded into the molten adhesive layer. This was followed by addition of another adhesive layer. While cooling to room temperature, the adhesive was covered with silicone release paper and a weight applied for 5 minutes to press the adhesive layer into the shape of the mold. The final thickness of adhesive layer was about ¼ inch. The finished bonds were then conditioned at 72° F./50% RH for two weeks before testing to allow for moisture cure. Peel was 180 degrees at 2 inch/min.

Lap Shear Test of Glass-PVC Substrate at Room Temperature and 180° F.:

The adhesive was applied as above to a clean PVC substrate. A stainless steel drawdown applicator (BYK-Gardner) was used to obtain a controlled thickness of 0.020 inches. Glass bead spacers 0.010 in thick were sprinkled on top of the adhesive layer to control the final bondline thickness. Clean glass strips 1 inch×4 inches were bonded with an overlapping area of 1 inch×1 inch using hand pressure. The finished bonds were then conditioned at 72° F./50% RH for two weeks before testing to allow for moisture cure. Samples were pulled at 0.5 inches/min in an Instron at room temperature or after heating the sample for 0.5 hr in an oven at 180° F. and testing immediately after removal from the oven.

Green Strength:

Lap shear bonds were made and tested as described above, but were tested largely uncured either after 5 minutes or 15 minutes after bonding. This test characterizes the ability of the bonded structure to survive handling in manufacture prior to full cure. Hot melts have the advantage of high strength in the green state which minimizes working inventory.

Shore Hardness A:

A 0.5 inch thick layer of adhesive was tested after cure (23° C./50% RH) using an ASTM Type A Durometer (model 306L).

The formulations of Samples 2a and 2b were compared with a conventional moisture curing hot melt based on isocyanate-terminated polyurethane commercially available from National Starch and Chemical Company under the trade name PURFECT GLAZE G for use as a window glazing compound. Results of the adhesive performance are shown in Table 2.

TABLE 2

|  | Sample 2a | Sample 2b | Purfect Glaze G |
|---|---|---|---|
| 180° peel in lbs off glass | 30 | 40 | 20 |
| Lap shear (glass/PVC) in lbs |  |  |  |
| 72° F. | 106 | 156 | 97 |
| 180° F. | 7 | 41 | 10 |
| Shore hardness A | 61 | 52 | 50 |
| Green strength in lbs |  |  |  |
| After 5 min cooling | 32 | 38 | 5 |
| After 15 min cooling | 39 | 48 |  |

The invention provides bubble-free bonds with much improved peel on glass and green strength. In addition, shear strengths can be higher with comparable hardness.

Example 3

Compatibilizing a silane-functional liquid polymer with a non-reactive solid acrylic polymer using tackifiers is shown.

The procedures described in Example 2 were used to prepare an adhesive using a polymer that is not silane-reactive. The ingredients in the formula were 0.8 parts of Resiflow LF, 60 parts of acrylic 1 in Table 1, 30 parts of KE-100, 30 parts of Kristalex 3100, 80 parts of MAX 951, 0.4 parts of Silquest A-1110, 2 parts of dibutyl tin dilaurate, and 3 parts glycidoxy propyl trimethoxy silane. The adhesive was clear and compatible at 240° F. A portion of this adhesive was placed in a glass jar at 266° F. for several hours. It remained clear and smooth in texture, with no evidence of phase separation. Upon cooling, however, the adhesive became cloudy.

Lap shear adhesion from glass was 129 lbs as measured according to the procedures in Example 2.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A moisture curable hot melt adhesive composition prepared from a mixture comprising:
   a silane-functional liquid polymer that is liquid at room temperature, represented by:

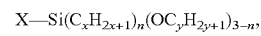

wherein n=0, 1 or 2; x and y are, independently, integral numbers from 1 to 12 and X is a group that links to a silane-functional polymer backbone; and the polymer backbone is selected from polyolefin, polyacrylate, polyurethane, polyether and acrylate modified polyether; and
   a silane-reactive polymer comprising silane reactive groups selected from the group consisting of carboxylic acid, amine, thiol and hydroxyl.

2. The adhesive composition of claim 1 wherein the mixture further comprises an adhesion promoter.

3. The adhesive composition of claim 2 wherein the mixture further comprises a catalyst.

4. The adhesive composition of claim 1 wherein the mixture comprises 20 to 80% by weight based on the weight of the adhesive composition of silane-functional liquid polymer, 5 to 70% by weight based on the weight of the adhesive composition of silane-reactive polymer, 0.01 to 10% by weight based on the weight of the adhesive composition of an adhesion promoter, 0.05 to 5% by weight based on the weight of the adhesive composition of a catalyst, and 0-70% by weight of adhesive composition of a tackifier.

5. The adhesive composition of claim 4 wherein the silane-reactive polymer is a solid.

6. The adhesive composition of claim 5 wherein the silane-reactive polymer is an acrylic polymer.

7. The adhesive composition of claim 1 wherein the mixture comprises 35 to 55% by weight based on the weight of the adhesive composition of silane-functional liquid polymer, the silane functional polymer backbone comprises polypropylene oxide, 20 to 40% by weight based on the weight of the adhesive composition of silane-reactive polymer comprising a solid acrylic polymer with acid functionality, 20-40% by weight based on the weight of the adhesive composition of tackifier, 0.2-3% by weight based on the weight of the adhesive composition of adhesion promoter, and 0.05-5% by weight based on the weight of the adhesive composition of catalyst.

8. A moisture curable hot melt adhesive composition prepared from a mixture comprising a silane-functional liquid polymer that is liquid at room temperature, represented by:

$$X\text{—}Si(C_xH_{2x+1})_n(OC_yH_{2y+1})_{3-n},$$

wherein n=0, 1 or 2; x and y are, independently, integral numbers from 1 to 12 and X is a group that links to a silane-functional polymer backbone; and the polymer backbone is selected from polyolefin, polyacrylate, polyurethane, polyether and acrylate modified polyether;

a non-silane-reactive polymer; and from about 10% to about 50% by weight based on the weight of the adhesive composition of a compatibilizing tackifier.

9. The adhesive composition of claim 1 wherein the silane-functional liquid polymer comprises an acrylate modified polyether backbone and the silane-reactive polymer is an acrylic polymer having silane reactive groups selected from the group consisting of carboxylic acid; hydroxyl and combinations thereof.

10. The adhesive composition of claim 1 wherein the hot melt adhesive in a solid form thereof has a phase separated morphology.

11. The adhesive composition of claim 1 providing isocyanate free moisture cure.

12. Cured reaction products of the adhesive composition of claim 1.

13. The adhesive composition of claim 1 or 8 which has a viscosity of less than 100,000 cP at 140° C.

14. The adhesive composition of claim 8 wherein the non-silane-reactive polymer is an acrylic polymer.

15. The adhesive composition of claim 14 wherein the mixture comprises about 20% to about 40% by weight based on the weight of the adhesive composition of a compatibilizing tackifier.

16. The adhesive composition of claim 8 wherein the non-silane-reactive polymer comprises an acrylic polymer.

17. The hot melt adhesive composition of claim 8 providing isocyanate free moisture cure.

18. The adhesive composition of claim 17 wherein a solid form thereof has a phase separated morphology.

19. Cured reaction products of the adhesive composition of claim 8.

* * * * *